United States Patent
Shelton et al.

(10) Patent No.: US 10,288,722 B2
(45) Date of Patent: *May 14, 2019

(54) TRAFFIC RADAR SYSTEM WITH AUTOMATED TUNING FORK TEST FEATURE

(71) Applicant: Kustom Signals, Inc., Lenexa, KS (US)

(72) Inventors: Maurice E. Shelton, Buffalo, KS (US); Michael J. Bietsch, Nevada, MO (US)

(73) Assignee: Kustom Signals, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/021,220

(22) Filed: Jun. 28, 2018

(65) Prior Publication Data

US 2018/0313936 A1    Nov. 1, 2018

Related U.S. Application Data

(63) Continuation of application No. 15/537,829, filed as application No. PCT/US2015/054021 on Oct. 5, 2015.

(60) Provisional application No. 62/059,472, filed on Oct. 3, 2014.

(51) Int. Cl.
*G01S 7/40*     (2006.01)
*G01S 13/92*    (2006.01)
*G01S 13/52*    (2006.01)

(52) U.S. Cl.
CPC .............. *G01S 7/4052* (2013.01); *G01S 7/40* (2013.01); *G01S 13/52* (2013.01); *G01S 13/92* (2013.01); *G01S 2007/4095* (2013.01)

(58) Field of Classification Search
CPC ........ G01S 7/4052; G01S 13/52; G01S 13/92; G01S 2007/4095; G01S 7/40
USPC .......................................................... 342/171
See application file for complete search history.

(56) References Cited

U.S. PATENT DOCUMENTS

| | | | | |
|---|---|---|---|---|
| 3,935,573 A | * | 1/1976 | Johnson | G01S 7/4021 342/171 |
| 4,656,481 A | * | 4/1987 | Mawhinney | G01S 7/40 342/171 |
| 5,886,663 A | * | 3/1999 | Broxon, II | G01S 7/4052 342/165 |
| 6,046,696 A | * | 4/2000 | Blanco | G01S 7/4052 342/165 |

(Continued)

OTHER PUBLICATIONS

SpeedTrak Radar Systems, Operator's Manual, Decatur Electronics, pp. 1-40, copyrighted 2003.

(Continued)

*Primary Examiner* — Timothy X Pham
(74) *Attorney, Agent, or Firm* — Erickson Kernell IP, LLC (57) ABSTRACT

A traffic radar system (TRS) utilizing an automated test process which aids the operator in quickly conducting comprehensive system tuning fork tests that includes front and rear antennas and stationary, moving opposite, and moving same-lane operations. The automated process has the ability to select the proper radar antenna and proper mode of operation for each step of the test. The process will measure the input fork signals and report if the signals are within the specified tolerance. Optionally, the process can be set to not allow the radar system to enter the normal operating mode if the tuning fork tests have not been successfully completed.

28 Claims, 8 Drawing Sheets

(56) References Cited

U.S. PATENT DOCUMENTS

| | | | |
|---|---|---|---|
| 2007/0109190 A1* | 5/2007 | Smith | G01S 7/4026 342/359 |
| 2010/0042350 A1* | 2/2010 | de Wild | G01S 7/4004 702/96 |
| 2015/0219752 A1* | 8/2015 | Lewis | G01S 7/40 342/104 |
| 2018/0032820 A1* | 2/2018 | Bietsch | G06T 7/20 |

OTHER PUBLICATIONS

Stalker DSR 2X Direction Sensing Moving Police Radar, Operator's Manual, Applied Concepts, Inc., pp. 1-47, copyrighted 2006.
MPH Industries BEEIII Automatic Same Direction Traffic Radar, Operation and Service Manual, MPH Industries, Inc., pp. 2-16, copyrighted 2001.
Talon Traffic Safety Radar, Operator's Manual, Kustom Signals, Inc., P/N 006-0604-00 Rev. 6, pp. 1.1-14.2, copyrighted 2003.

\* cited by examiner

TRAFFIC RADAR SYSTEM WITH AUTOMATED TUNING FORK TEST FEATURE

CROSS-REFERENCE TO RELATED APPLICATIONS

This is a continuation of pending U. S. patent application Ser. No. 15/537,829, filed Jun. 19, 2017, which is the National Stage of International Application No. PCT/US2015/054021, filed Oct. 5, 2015, which claims the benefit of application Ser. No. 62/059,472, filed Oct. 3, 2014, all entitled TRAFFIC RADAR SYSTEM WITH AUTOMATED TUNING FORK TEST FEATURE.

FIELD

The present invention relates to traffic radar systems for law enforcement and related applications and, more particularly to traffic radar systems in which a periodic tuning fork test is required.

BACKGROUND

Traffic enforcement systems utilizing Doppler radar technology have been in use for a number of years. Law enforcement agencies deploy these traffic radar systems (TRS) as a tool in the enforcement of vehicle speed regulations. The Court has established that a tuning fork test is an accurate method of testing the accuracy of the radar unit and along with the visual observations of a trained operator, allows for an accurate means of determining the speed of vehicles. It is typical for the law enforcement agencies utilizing these radar systems to require the operating officer to conduct periodic tuning fork tests. Typically these tests would be conducted at the beginning of the work shift.

It would be advantageous in the design of the TRS to allow for a method of an automated sequence to step the officer through the tuning fork tests before entering the normal enforcement operating mode. This automated sequence, for example, could be accomplished by displaying test prompts and messages on the device during the power up sequence.

Another improvement of the invention would be to allow the TRS, not just the operator, to verify the correct measurement during each step of the tuning fork tests.

Another desired improvement in a TRS would be to display a message to the operator for each of the tuning fork test steps indicating whether the test "passed" or "failed."

Still another desired improvement in a traffic system would be to allow the law enforcement agency to determine the operational behavior of the TRS if the tuning fork tests were not successfully completed. One example of the TRS behavior would be for the operator to have to press a switch or button to acknowledge the failed or incomplete fork test to continue operation. Another example of the behavior would be for the TRS to not proceed to normal operation if the tuning fork tests are not successfully completed.

SUMMARY

In an embodiment of the present invention, the aforesaid may be addressed by a method for the traffic radar system (TRS) to provide an automated sequence of steps for the tuning fork tests. This new feature of tuning fork testing may be enabled in the TRS at time of manufacture. The manufacturer may enter into the TRS the measurement values of the certified tuning forks that are shipped along with the TRS. Knowing the expected measurement values of the forks allows the TRS to aid the operator in determining if the measurements are correct during the periodic tuning fork tests.

The TRS may include an option related to the fork test feature that allows the operator to skip the automated fork test sequence if the previous test sequence was conducted within a set period of time.

An additional aspect may allow an option related to the fork test feature for the purchasing agency to select if the TRS should only remind and aid the operator through the tuning fork test or to require the completion the tuning fork tests before normal law-enforcement operations can begin.

Other advantages of this invention will become apparent from the following description taken in connection with the accompanying drawings, wherein is set forth by way of illustration and example, an embodiment of the present invention.

DETAILED DESCRIPTION

Figure 1:
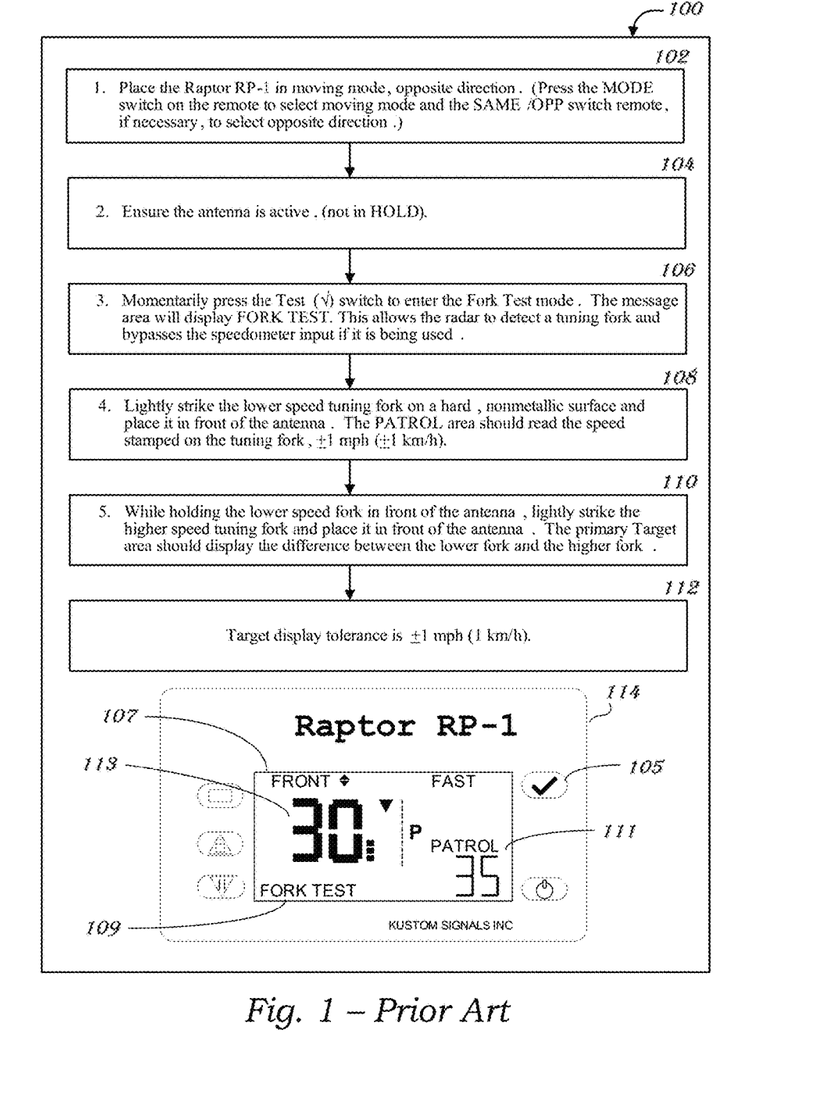
FIG. 1 is a prior art example of moving opposite tuning fork test.

Turning more particularly to the drawings, FIG. 1 depicts a block diagram of a prior art tuning fork test for a traffic radar system (TRS) in the moving opposite mode of operation. This example shows the current state of the industry TRS tuning fork test process, generally referred to by reference number 100. This process description is from the Kustom Signals, Inc. Raptor RP-1 testing procedures as a specific example. A tuning fork test is recommended by the manufacturer of a TRS to be conducted at the beginning and end of each patrol shift to ensure the accuracy and functionality of the unit. Initially, the unit is configured for moving mode, opposite direction operation. Block 102. After ensuring that the antenna is active (Block 104), the test switch 105 is pressed to enter the Fork Test mode. Block 106. A message area of the display 107 will show FORK TEST 109. In Fork Test mode, the TRS unit detects a near field tuning fork, and ignores the speedometer input, which would be zero, if used.

First, the lower speed tuning fork is struck on a hard, nonmetallic surface and placed in front of the TRS antenna. Block 108. The speed, shown as 35 mph for PATROL 111, is displayed and the user compares the PATROL speed 111 to the speed stamped on the tuning fork. While still holding the lower speed fork in front of the antenna, a second higher speed tuning fork is struck on a hard, nonmetallic surface and placed in front of the antenna. Block 110. The primary target area 113 should display the difference between the speed stamped on the lower speed tuning fork and the higher speed tuning fork.

It is completely the responsibility of the operator to make the calculation of the difference of the two forks and to verify the displayed reading for 'Target' speed 113 is within tolerance. The allowed displayed reading tolerance is typically +/−1 mph (1 km/h). Block 112. An example of the possible displayed values is shown when a 35 lower tuning fork and a 65 higher tuning fork are used for the test (114).

Figure 2:
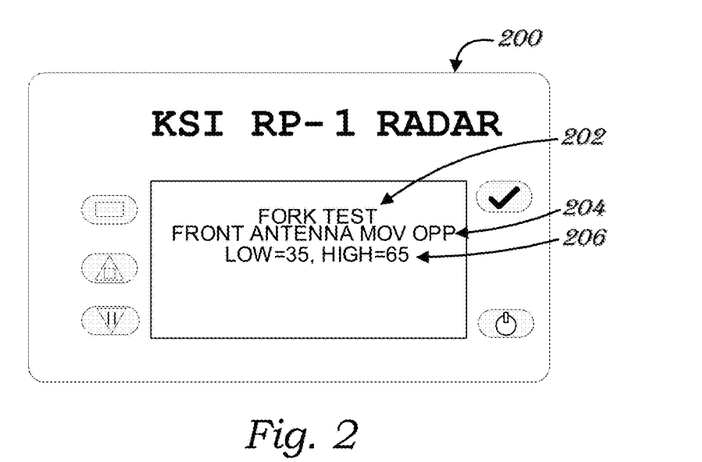
FIG. 2 is an illustration of a start of fork test message of the present invention.

In the preferred embodiment, the invention provides a test sequence that automatically sets the operational mode of the TRS in preparation for the tuning fork test. FIG. 2 illustrates examples of the start of the fork test sequence as depicted by the preferred embodiment of the invention on the Kustom Signals Inc. Raptor RP-1 Radar system (200). This test sequence may be initiated during the power-up cycle or by some action from the operator. Display line 202 indicates the Fork Test is in process. In the preferred embodiment, the invention automatically sets the TRS mode of operation. In this example the front antenna is activated and the test will be conducted for moving opposite lane mode as indicated by display line 204. Display line 206 alerts the operator as to the values of the expected forks, 35 and 65 in this example. In the preferred embodiment, this message may be displayed for a set time period, such as one or more seconds, and then the TRS will begin prompting the operator through the fork test sequence.

Figure 3:
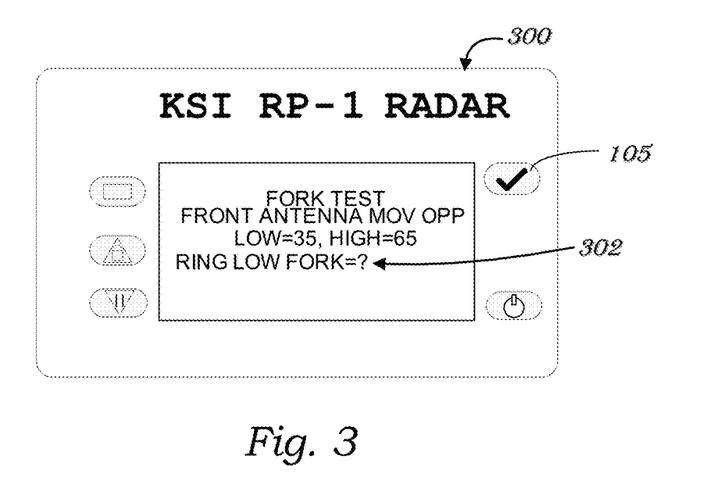
FIG. 3 is an illustration of a moving opposite low fork prompt.

Another advantage of the invention is to inform the operator as to when and which tuning fork to strike and place in front of the antenna. FIG. 3, block 300, display line 302 shows a display message to prompt the operator to ring the low fork in front of the front antenna. At this point, or during any of the following fork test screens, if the option was set to "Remind," then the operator is presented with the option to cancel the fork tests and proceed to the normal operating mode. In the preferred embodiment the test switch 105 may be pressed to cancel the tuning fork tests. Optionally, if the tuning fork tests have been conducted in a previous set amount of time, the user may also cancel the current test sequence and proceed to normal operation.

Figure 4:
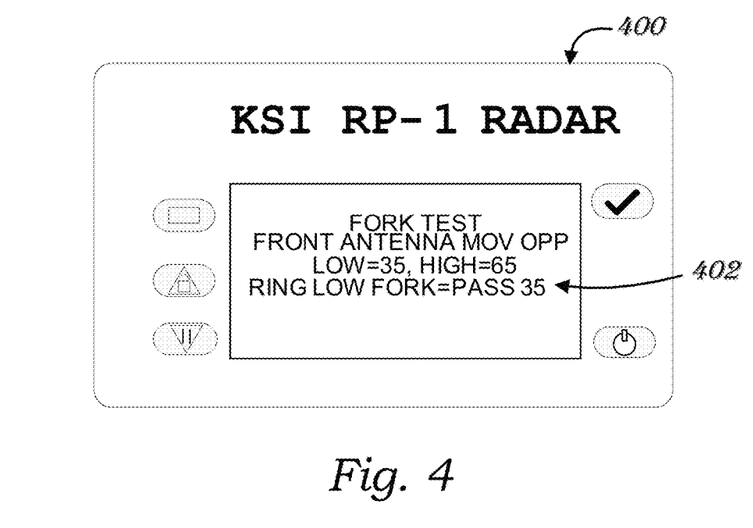
FIG. 4 is an illustration of a moving opposite low fork results.

To continue the fork test the operator rings the low fork (35 mph) and places it in front of the front antenna. The TRS automatically measures the fork signal, converts it to a truncated speed value and compares it to the expected low fork speed value. The measured value must be within the allowed tolerance, typically +/−1, of the expected value for the test to pass. Referring to FIG. 4, block 400, display line 402 shows an example of the TRS correctly measuring the low fork signal. The invention advantage is that the operator alone is not required to visually verify the reading on the display matched the fork within the tolerance. The invention automatically determines if the measurement is within a predetermined range. The measured values may be stored for each test. If the measurement is not within a predetermined range, the unit may be disabled. In the preferred embodiment, once the low fork test has passed, this message may be displayed for a set time, typically one or more seconds, and then the TRS will sequence to the next step of the fork tests.

Figure 5:
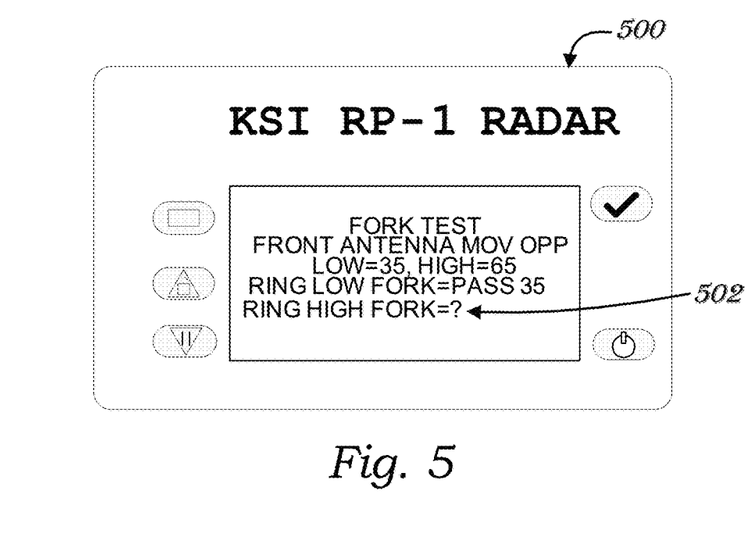
FIG. 5 is an illustration of a moving opposite high fork prompt.
Figure 6:
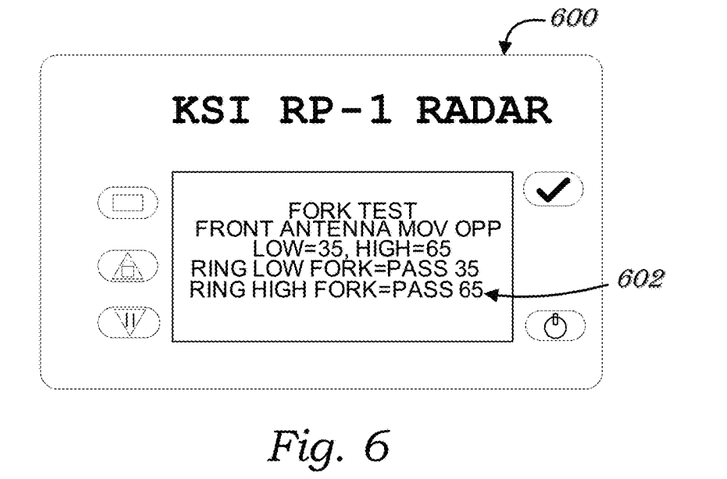
FIG. 6 is an illustration of a moving opposite high fork results.

The next step in the fork test is for the operator to ring the high fork and place it in front of the front antenna. Another advantage to the invention is the low fork measurement from the preceding step may be saved for the calculations in the results testing in the following steps. The operator is not required to continue holding the low fork as in the traditional test (see FIG. 1, block 110). Referring to FIG. 5, block 500, display line 502 shows an example of a prompt for the operator to now ring the high fork in front of the front antenna. The TRS automatically measures the new fork signal, converts it to a truncated speed value and compares it to the expected high fork speed value. The measured value should be within the allow tolerance, typically +/−1, of the expected value for the test to pass. FIG. 6, block 600, display line 602 shows an example of the TRS correctly measuring the high fork signal.

Figure 7:
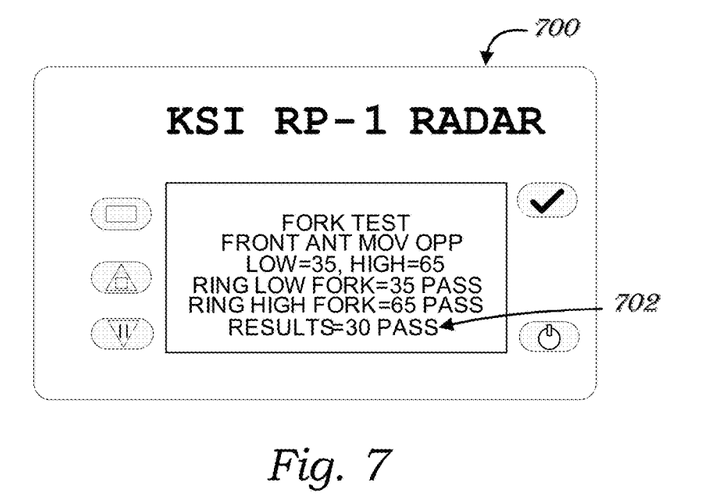
FIG. 7 is an illustration of a moving opposite fork test results.

The next step in traditional fork test would be for the operator to calculate the difference of the high fork and low fork and ensure that the displayed value is within the correct tolerance of the difference value (see FIG. 1, blocks 110 and 112). The advantage of this step in the present invention is that the TRS will automatically calculate the difference of the high and low fork measurements, display the results, and pass or fail the test based on the difference results being within the allowed tolerance. Referring to FIG. 7, block 700, display line 702 shows an example of the TRS display when the measured fork signals were correct. In the preferred embodiment, this would complete the fork tests for the front antenna. After the results message 702 is displayed by a set time, typically one or more seconds, the test sequence may switch to the rear antenna. The preferred embodiment may determine a rear antenna is present. If no rear antenna is present, the remaining fork test sequence will be cancelled and the unit will enter the normal operating mode.

Figure 8:
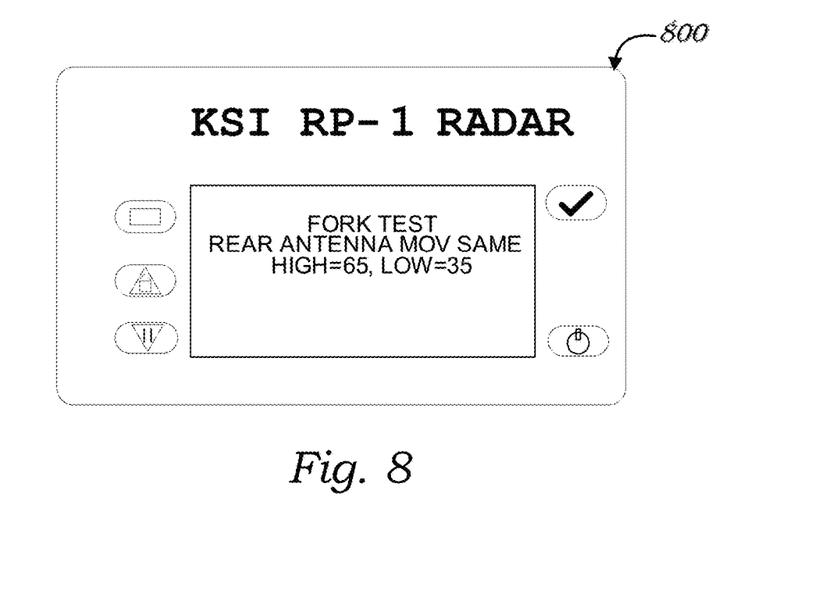
FIG. 8 is an illustration of a moving same-direction rear antenna message.
Figure 9:
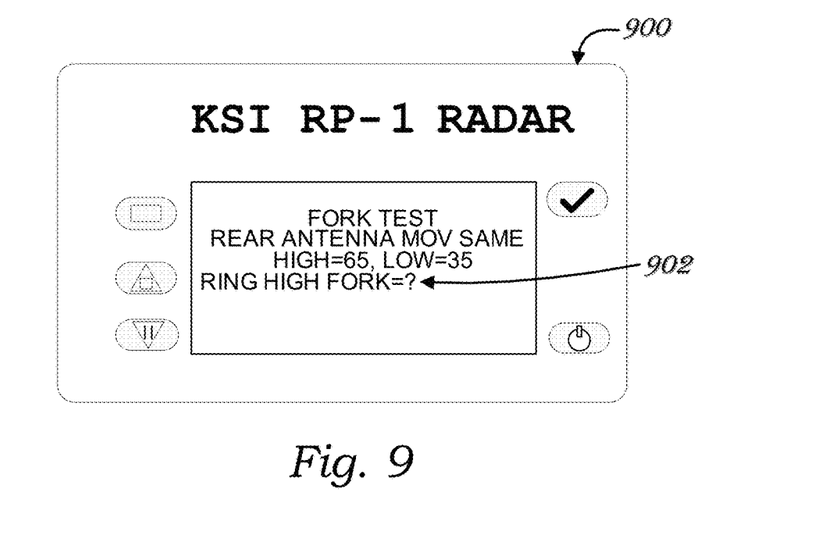
FIG. 9 is an illustration of a moving same-direction high fork prompt.

In the preferred embodiment, the fork test for the rear antenna may follow much the same sequence as the front antenna, with the following exception. Since the moving opposite mode was tested during the front antenna tests, the moving same-direction mode may be tested during the rear antenna tests. Referring to FIG. 8, block 800, an example of the TRS display is shown when the rear antenna fork test sequence starts. This message will be displayed for a set period of time, typically one or more seconds, and then the operator may be prompted to ring the high fork in front of the rear antenna as show in the example FIG. 9, block 900, display message line 902.

Figure 10:
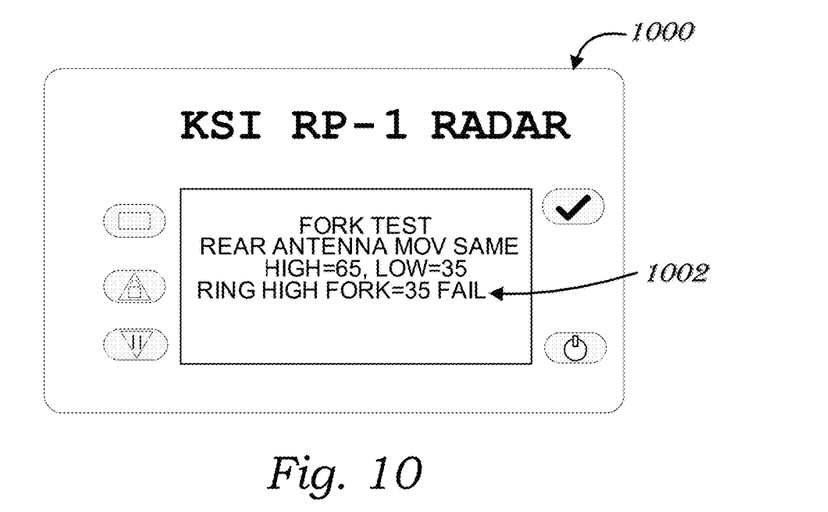
FIG. 10 is an illustration of a moving same-direction high fork fail.
Figure 11:
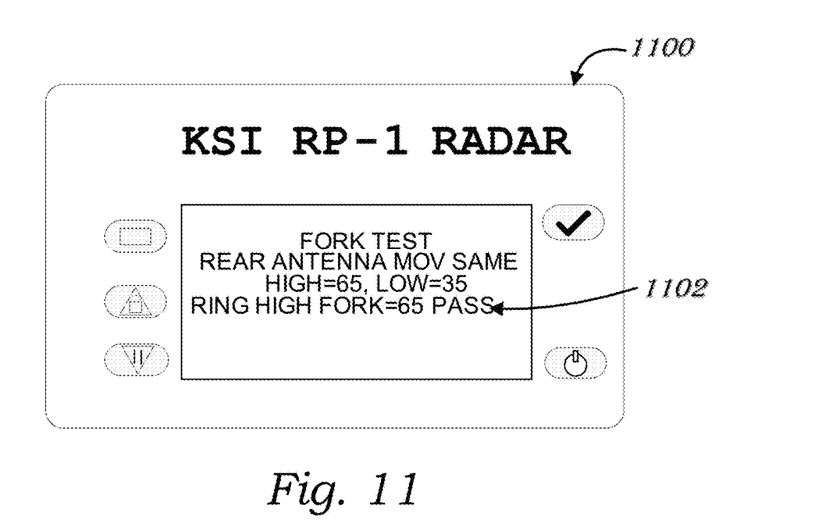
FIG. 11 is an illustration of a moving same-direction high fork results.

During the moving same-direction test for the front antenna the high fork is rung first, whereas in the moving opposite test the low fork was rung first. Previous to this invention, it would be easy for the operator to mistakenly follow the same test routine for the rear antenna, ringing the low fork first during the moving same-direction test, making it difficult it determine why the test results are not correct. Referring to FIG. 10, block 1000, display message 1002 shows an example of how the invention alerts the operator if an incorrect fork or an incorrect measurement was found. A message 1002 is displayed if the low fork first was used instead of the high fork. The test will not proceed until the correct signal is measured. An advantage of the invention is that with the displayed message the operator will quickly realize that the fork is incorrect. Referring to FIG. 11, block 1100, shows an example display message 1102 when the correct fork is used.

Figure 12:
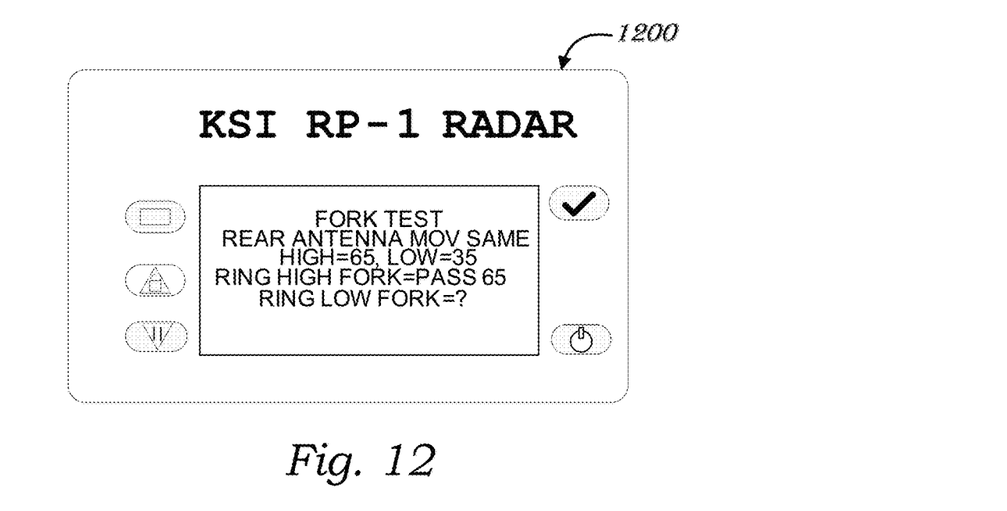
FIG. 12 is an illustration of a moving same-direction low fork prompt.
Figure 13:
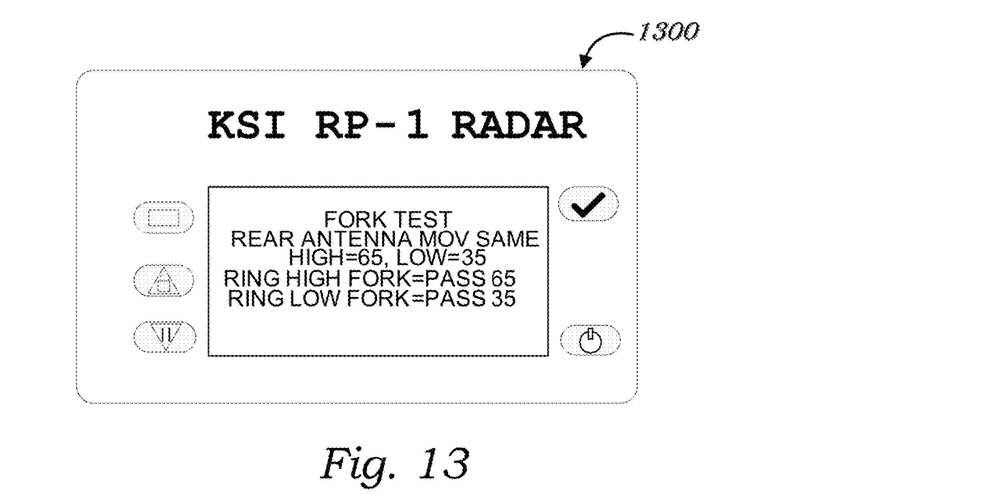
FIG. 13 is an illustration of a moving same-direction low fork results.

The next sequence in the tests is for the operator to ring the low fork in front of the rear antenna. In the preferred embodiment, the high fork can now be removed as the system has saved this measurement for later use in the results test. Referring to FIG. 12, block 1200 shows an example of a prompt for the operator to ring the low fork and FIG. 13, block 1300 shows the results of the low fork test.

Figure 14:
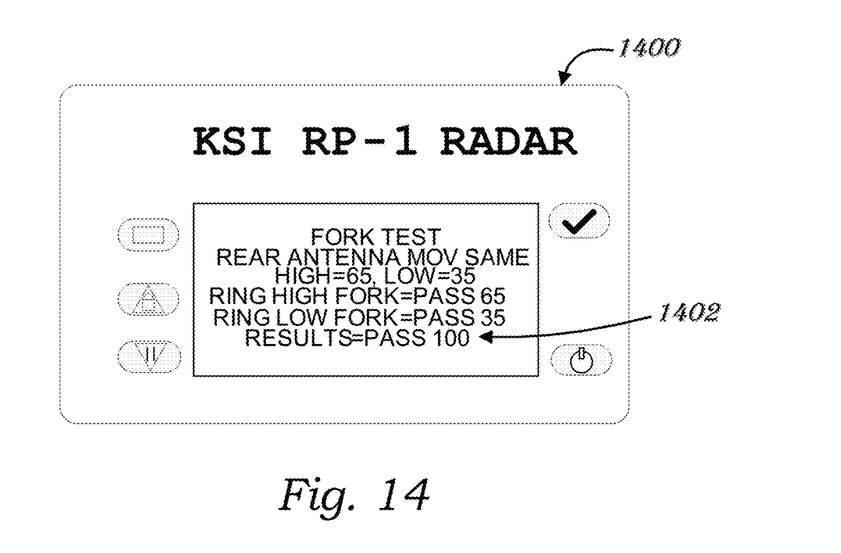
FIG. 14 is an illustration of a moving same-direction fork test results.

The next step in the traditional fork test would be for the operator to calculate the sum of the high and low forks and ensure the displayed value is within the correct tolerance of the displayed sum value. The advantage of the invention is the TRS will automatically calculate the sum of the high and low fork measurements, display the results, and pass or fail the test based on the sum results being within the allowed tolerance. Referring to FIG. 14, block 1400, display line 1402 shows an example of the TRS display when the measured fork signals are correct. In the preferred embodiment, this completes the fork tests for both front and rear antennas. After the results message 1402 is displayed for a predetermined time, typically one or more seconds, the fork test sequence ends and the unit enters the normal operating mode.

It is to be understood that while certain now preferred forms of this invention have been illustrated and described, it is not limited thereto except insofar as such limitations are included in the following claims.

Having thus described the invention, what is claimed as new and desired to be secured by this patent is as follows:

1. A tuning fork test method for a traffic radar system comprising: transmitting a radar signal from a first antenna of a traffic radar apparatus;
   determining a first speed of a first tuning fork vibrating at a first frequency and placed in front of said first antenna, said first speed determining step by a controller of said traffic radar apparatus;
   determining a second speed of a second tuning fork vibrating at a second frequency and placed in front of said first antenna, said second speed determining step by said controller;
   determining a differential speed between said first speed and said second speed, said differential speed determining step by said controller;
   conveying a first pass indication or a first fail indication from a first predetermined criteria and said differential speed, said first pass indication conveying step by said controller;
   selectively disabling said traffic radar system if said fail indication is conveyed, said selectively disabling step by said controller;
   optionally determining if a second antenna of said traffic radar apparatus is present;
   if a second antenna is present, transmitting a radar signal from said second antenna of said traffic radar apparatus;
   determining a third speed of said second tuning fork vibrating at said second frequency and placed in front of said second antenna, said third speed determining step by said controller;
   determining a fourth speed of said first tuning fork vibrating at said first frequency and placed in front of said second antenna, said fourth speed determining step by said controller;
   determining a second differential speed between said third speed and said fourth speed, said second differential speed determining step by said controller;
   conveying a second pass indication or a second fail indication from a second predetermined criteria and said second differential speed, said second pass indication conveying step by said controller; and
   selectively disabling said traffic radar system if said second fail indication is conveyed, said selectively disabling step by said controller.

2. The method of claim 1 further comprising prompting a user to strike and place said first tuning fork in front of said first antenna.

3. The method of claim 1 further comprising comparing said first speed to a first expected speed.

4. The method of claim 3 further comprising determining if said first speed is within a first predetermined tolerance of said first expected speed.

5. The method of claim 4 further comprising displaying a pass/fail message for said first speed for a predetermined time.

6. The method of claim 1 wherein said first speed is stored in said traffic radar system.

7. The method of claim 1 further comprising prompting a user to strike and place said second tuning fork in front of said first antenna.

8. The method of claim 1 further comprising comparing said second speed to a second expected speed.

9. The method of claim 8 further comprising determining if said second speed is within a second predetermined tolerance of said second expected speed.

10. The method of claim 9 further comprising displaying a pass/fail message for said second speed for a predetermined time.

11. The method of claim 1 wherein said second speed is stored in said traffic radar system.

12. The method of claim 1 further comprising prompting a user to strike and place said second tuning fork in front of said second antenna.

13. The method of claim 1 further comprising comparing said third speed to said third expected speed.

14. The method of claim 13 further comprising determining if said third speed is within a third predetermined tolerance of said third expected speed.

15. The method of claim 14 further comprising displaying a pass/fail message for said third speed for a predetermined time.

16. The method of claim 1 wherein said third speed is stored in said traffic radar system.

17. The method of claim 1 further comprising prompting a user to strike and place said first tuning fork in front of said second antenna.

18. The method of claim 1 further comprising comparing said fourth speed to said fourth expected speed.

19. The method of claim 18 further comprising determining if said fourth speed is within a fourth predetermined tolerance of said fourth expected speed.

20. The method of claim 19 further comprising displaying a pass/fail message for said fourth speed for a predetermined time.

21. The method of claim 1 wherein said fourth speed is stored in said traffic radar system.

22. A traffic radar apparatus comprising:
   a first antenna transmitting a radar signal;
   a controller determining a first speed of a first tuning fork vibrating at a first frequency and placed in front of said first antenna;

said controller determining a second speed of a second tuning fork vibrating at a second frequency and placed in front of said first antenna;

said controller determining a first differential speed between said first speed and said second speed;

said controller conveying a first pass indication or a first fail indication from a first predetermined criteria and said first differential speed;

said controller selectively disabling said traffic radar system if said first fail indication is conveyed;

a second antenna transmitting a radar signal;

said controller determining a third speed of said second tuning fork vibrating at said second frequency and placed in front of said second antenna;

said controller determining a fourth speed of said first tuning fork vibrating at said first frequency and placed in front of said second antenna;

said controller determining a second differential speed between said third speed and said fourth speed;

said controller conveying a second pass indication or a second fail indication from a second predetermined criteria and said second differential speed; and said controller selectively disabling said traffic radar system if said second fail indication is conveyed.

23. The apparatus of claim 22 wherein said first differential speed is stored in said traffic radar apparatus.

24. The apparatus of claim 22 wherein said second differential speed is stored in said traffic radar apparatus.

25. The apparatus of claim 22 further comprising:

said controller comparing said first speed to said first expected speed;

said controller determining if said first speed is within a first predetermined tolerance of said first expected speed;

said controller displaying a pass message for a predetermined time if said first speed is within a first predetermined tolerance of said first expected speed;

said controller displaying a fail message for a predetermined time if said first speed is not within a first predetermined tolerance of said first expected speed for said first speed; and said controller storing said first speed in said traffic radar apparatus;

wherein if said fail message is displayed, said controller selectively disabling said traffic radar apparatus.

26. The apparatus of claim 22 further comprising:

said controller comparing said second speed to said second expected speed;

said controller determining if said second speed is within a second predetermined tolerance of said second expected speed;

said controller displaying a pass message for a predetermined time if said second speed is within a second predetermined tolerance of said second expected speed;

said controller displaying a fail message for a predetermined time if said second speed is not within a second predetermined tolerance of said second expected speed for said second speed; and said controller storing said second speed in said traffic radar apparatus;

wherein if said fail message is displayed, said controller selectively disabling said traffic radar system.

27. The apparatus of claim 22 further comprising:

said controller comparing said third speed to said third expected speed;

said controller determining if said third speed is within a third predetermined tolerance of said third expected speed;

said controller displaying a pass message for a predetermined time if said third speed is within a third predetermined tolerance of said third expected speed;

said controller displaying a fail message for a predetermined time if said third speed is not within a third predetermined tolerance of said third expected speed for said third speed; and said controller storing said third speed in said traffic radar apparatus;

wherein if said fail message is displayed, said controller selectively disabling said traffic radar system.

28. The apparatus of claim 22 further comprising:

said controller comparing said fourth speed to said fourth expected speed;

said controller determining if said fourth speed is within a fourth predetermined tolerance of said fourth expected speed;

said controller displaying a pass message for a predetermined time if said fourth speed is within a fourth predetermined tolerance of said fourth expected speed;

said controller displaying a fail message for a predetermined time if said fourth speed is not within a fourth predetermined tolerance of said fourth expected speed for said fourth speed; and said controller storing said fourth speed in said traffic radar apparatus;

wherein if said fail message is displayed, said controller selectively disabling said traffic radar system.

\* \* \* \* \*